Dec. 14, 1965   J. E. BERNASCONI   3,223,375
ROPE HOLDDOWN HOOK AND BRACKET THEREFOR
Filed April 30, 1964
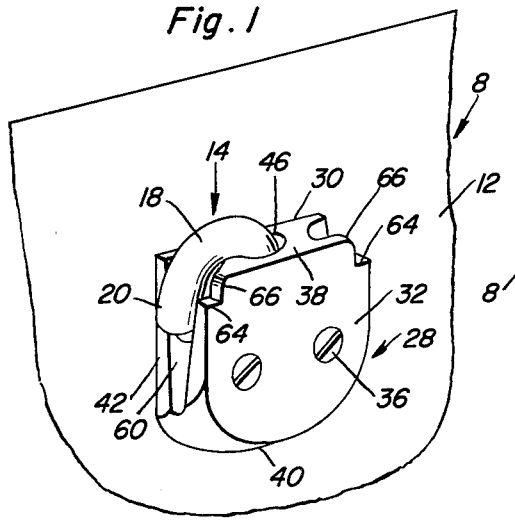
Fig. 1
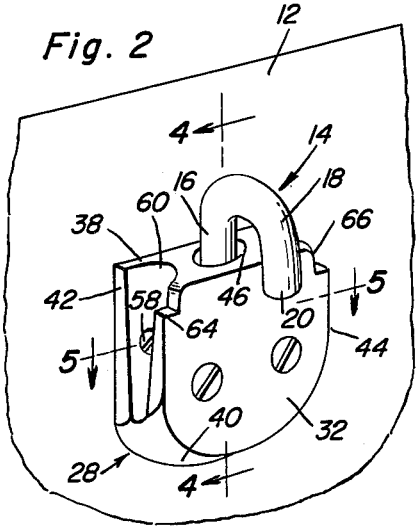
Fig. 2
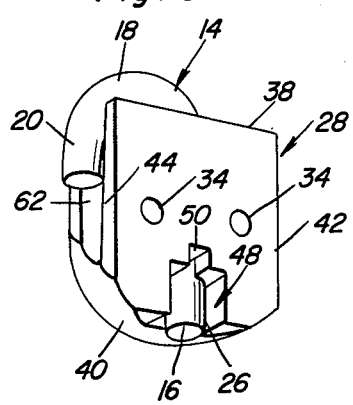
Fig. 3
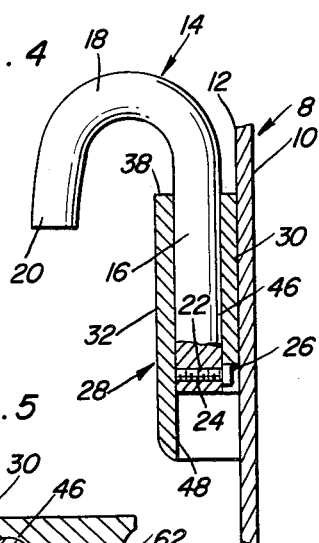
Fig. 4
Fig. 5
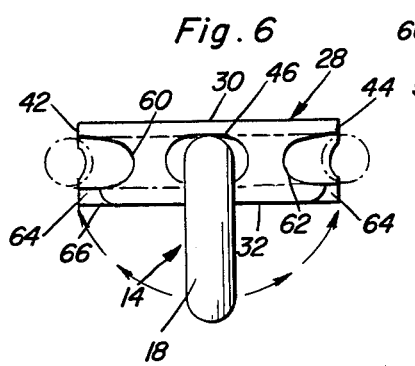
Fig. 6
Joseph Edwin Bernasconi
INVENTOR.
BY
Attorneys United States Patent Office 3,223,375
Patented Dec. 14, 1965

3,223,375
ROPE HOLDDOWN HOOK AND BRACKET THEREFOR
Joseph Edwin Bernasconi, 3145 S. Cole Road, Boise, Idaho
Filed Apr. 30, 1964, Ser. No. 363,839
8 Claims. (Cl. 248—361)

This invention relates to a simple, practical safely usable mechanical device which is functionally designed and structurally adapted to facilitate handling, orienting and secure retention of a load-binding line or rope such as commonly lashed over and drawn tightly around a load which is being transported in a load-hauling conveyance, for example, a farm-type pickup truck and has to do, more particularly, with an improved rope positioning and tautening hook.

It is common in the art to employ line hold-down hooks, at least one on each exterior side of the truck body. The shank of the hook is fixed in one manner or another and the bill portion or beak of the hook is directed downwardly so that the rope can be seated in the crotch of the hook placed under tension and the ends suitably secured together. Outstanding hooks are, however, regarded as a nuisance and, in fact, are dangerous. Not only do they get in the way of the worker loading the truck, they rip and tear one's clothing and often result in injuries which can be and often are serious. The foregoing conditions have long posed a problem which though widespread appears not to have been solved. It follows that the principal object of the present invention is to acceptably solve the problem.

To the ends desired, a hook or equivalent means is used but is specially constructed and, what is more important, is installed and mounted in such a manner that it can be retracted and stored in a safeguarded out-of-the-way place and position when it is not needed.

In carrying out the concept, the device employed is feasible for expedient handling and use, is inexpensive to manufacture, embodies a minimum of component parts, minimizes the need for repairs, does not become fouled from sand, grit or debris and does not fold or recede for storage into the surface on which it is installed. It maximizes the safety factor, can be easily installed by bolting or otherwise mounting the bracket part on the exterior of the truck bed's wall and hence does not mar the wall or detract from the intended good appearance thereof. Then, too, when the hook is projected for use, it stays put and permits effective retention of the coacting portion of the load binding rope even when, as is often the case, the load bulges and overhangs the outside of the wall on which the hook is mounted.

This invention is such in construction and adaptability that it is effectively applicable to and satisfactorily usable on any model pickup or truck without requiring alterations and, accordingly, can be installed by the owner of the truck. It is applied to the outside surface of the truck bed and well serves the overall purposes for which it is intended. While the device is capable of being used in an existing type stake hole, it need not be.

The device is sturdy and reliable and the rope looping and tautening (tying if desired) hook stays put in (1) its right angular outstanding holddown portion or (2) in its retracted stored position. A spring-loaded ball detent functions to prevent lost motion and chattering and insures against undesirable rattling. Two simply usable bolt holes permit ready and reliable installation. And, while the device was perfected for use on pickup beds, it can be equally well used on large trucks, trailers, boats and wherein the holddown and similar rope hooks are commonly used.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fragmentary portion of a truck body wall or an equivalent support and, what is more important, the projectible and retractible holddown hook and the supporting and attaching bracket therefor, the hook being shown in its closed or retracted position;

FIGURE 2 is a view in perspective similar to FIGURE 1 and showing the same component part and arrangement but illustrating the hook in its projected ready-to-use rope-accommodating position;

FIGURE 3 is a view in perspective observing the inward surface or side of the bracket with the hook retracted;

FIGURE 4 is a section taken on the vertical section line 4—4 of FIGURE 2 looking in the direction of the arrows;

FIGURE 5 is a horizontal section taken on the plane of the section line 5—5 of FIGURE 2; and FIGURE 6 is a top plan view which shows in full and dotted lines the manner in which the swingable holddown hook may be swung either to the left or right to assume its retracted out-of-the way position.

Referring now to the views of the drawing and in particular to FIGURES 1 to 3, inclusive, the numeral 8 designates relatively stationary support means which, more specifically, represents a fragmentary portion of the wall of a pickup truck body. The interior surface (FIG. 4) is denoted by the numeral 10 and the exterior or outer surface by the numeral 12. The novel rope accommodating means, broadly construed, comprises an inverted substantially J-shaped member 14 embodying a stout rigid component which is herein denoted as the attaching and journaling shank 16. The curved upper end portion provides the hook proper 18 and the terminal bill portion being denoted at 20. The lower end portion of the shank (FIG. 4) is provided with a transverse screw-threaded hole 22 into which the screw-threaded stem 24 of a headed fastener is screwed. The head portion 26 projects beyond the peripheral portion of the shank and constitutes a detent or keeper which is to be referred to later.

The adapter means is denoted, as an entity, by the numeral 28. Specifically, it comprises a bracket, which, in turn, comprises a solid metal block-like body. This body has a planar inward surface 30 superimposed upon the exterior surface 12 of the wall 8. The forward planar surface is denoted at 32. The median portion of the block is provided (FIG. 3) with suitably arranged boltholes 34 which serve to accommodate the bolts or screw-threaded headed fasteners 36 by way of which the bracket is mounted rigidly on the surface 12. This block-like body embodies a top marginal portion 38, a bottom marginal portion 40 and vertical marginal edge portions 42 (the one at the left in FIGURES 1 and 2 for example) and 44 (the one at the right). It will be noted that the upper edge is substantially flat. The median or central portion of the block or body is provided with an open-ended bore 46 which provides a bearing and which serves to accommodate the rotatable and slidably fitted shank 16. It will be further noted that (FIG. 3) the median rearward surface portion is provided with a substantially rectangular recess 48 which constitutes an accommodation and clearance pocket for the upwardly and downwardly slidable and rotatable shank 16. It will be further noted that the numeral 50 designates a notch which is identified as a keeper notch and which serves to accommodate the keeper or detent 26 when the latter is in the hook-projecting and locking position illustrated, for example, in FIGURE 4. There is also an auxiliary and relatively small bore 52 (FIG. 5) which opens at its outer end through the edge 42 and which communicates at its inner end with the median portion of the bore 46. This bore serves to accommodate a ball detent 54 which is pressed against a surface portion of the shank by an enclosed cooperating coil spring 56, said spring being held in place by a screw-threaded spring adjusting and retaining plug 58. The ball detent exerts sufficient frictional pressure on the shank to minimize the likelihood of the shank accidentally turning, particularly when in the position shown in FIGS. 1 and 3. Primarily, however, the ball detent functions to guard against lost motion or play of the shank and consequently it prevents undue and undesirable chattering when the hook is in either the projected position or the retracted closed position.

It will be further noted that each marginal edge portion 42 or 44 is provided with grooves, one of which is denoted at 60 and the other one at 62. These grooves provide channels and serve to accommodate the bill portion 20 when the hook is in its retracted out-of-use position.

It will be noted that the length of the aforementioned slidable and rotatable shank 16 is commensurate with the bore 46 in which it is mounted for operation. Therefore, when the hook 18 is in the out-of-use or closed position and the shank 16 is all the way down in the bore the bottom of the shank does not protrude objectionably beyond the bottom marginal surface 40. It is in this position that the spring-loaded ball detent 54 is especially effective since at this time the truck which is provided with the device would be in motion and unless some satisfactory means were provided to guard against lost motion the retracted hook might be bounced out of place and caused to rattle or chatter. It will be noted further that by having grooves 60 and 62 either of the grooves can be utilized in accommodating the bill portion of the hook. Thus (FIGURE 6) it will be evident that when the hook is no longer needed for rope holddown purposes it can be swung in the direction of the arrows to either the left or right side. Then it can be seated in the selected channel or groove to assume its out-of-the-way or retracted position. It will be further noted that the upper right and left corner portions of the front surface are provided with suitable notches 64 which define and provide rounded shoulders 66. These clearance notches and shoulders facilitate the step of moving the hook from its projected in-use position to its retracted out-of-use position.

It is reiterated that FIGS. 1 and 3 reveal the featured folded or retracted position of the hook when it is not being used. On the other hand FIGS. 2 and 4 reveal the desired projected in-use position of the hook at which time the detent 26 is seated and accordingly locked in the keep notch or seat 50. To accomplish this result it is necessary to lift the hook by hand, line up the detent with the notch and then lift the hook further so that the detent is properly seated. Once the detent is in its seat the spring pressed ball comes into play and assists in retaining the parts in this stay-put relationship. When the hook of FIGS. 2 and 4 is not to be used the hook is then pressed downwardly causing the shank to slide in the bore or bearing 46 and releasing the detent from the keeper notch. Then the detent is in the clearance pocket or recess 48 and the user can easily swing the hook from the position shown in FIG. 6 either to the left or right and then force it down again until the bill portion is seated in the desired channel. As mentioned the clearance notches and shoulders 66 make this movement of the hook from one position to the other position easily accomplished.

It is believed that a careful consideration of the specification in conjunction with the views of the drawing and the invention as claimed will enable the reader to obtain a clear and comprehensive understanding of the component parts, the manner in which they are individually constructed and manually handled to bring about the desired open and closed positions of this safety-type holddown hook. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within tthe scope of the invention as claimed.

What is claimed as new is as follows:

1. For use on the outward side of the wall of a pickup truck or similar load-hauling conveyance wherein a rope or the like is used to bind and retain the grain, hay or similar load in place, means for positioning and tautening an end portion of said rope, said means comprising a heavy duty J-shaped member providing an attaching and journaling shank and a rope hook at one end, and means for mounting and anchoring said first-named means in a given position on said outward side, said mounting and anchoring means having a bearing and said shank being journaled for rotation in said bearing and permitting said hook to be positioned at right angles to the plane of said outward side when desired for rope hitching use and, alternatively, to be swung toward and positioned close to said outward side when not intended to be used, said mounting and anchoring means comprising a block-like constituting a bracket, said body having an open-ended bore extending therethrough and defining the aforementioned bearing, said body having a keeper seat and said shank having a detent constituting a keeper and releasably engageable with said keeper seat.

2. The structure according to claim 1, and wherein said body is provided on at least one marginal edge with a groove in which the bill portion of said hook can be seated and stored when said hook is not to be used.

3. The structure according to claim 2, and wherein a spring-pressed ball detent is mounted in said body and is spring-biased into friction-retentive contact with a surface portion of said shank, whereby to prevent said J-shaped member from sliding or rotating in said bore.

4. A rope hitching and holddown device for use on a pickup truck or the like comprising a solid block-like body constituting a bracket, said body having planar inwardly and outwardly facing surfaces, top, bottom and left and right side marginal portions, said side marginal portions having channel-like grooves opening at upper ends through said top, the median portion of said body having a bore therethrough and opening through said top and bottom, said bore providing a bearing, and a complemental J-shaped member embodying a journaling shank and a holddown hook at an upper end of said shank, said shank being rotatably and slidingly mounted in said bore with the hook at its upper end, the bill portion of said hook being seated and partially sheathed and stored in a coacting upper end portion of a selected one of said grooves.

5. The structure according to claim 4, and wherein said body is provided with a notch providing a keeper seat and the lower end portion of said shank is provided with a laterally projecting detent, the latter constituting a keeper and being releasably seatable at will in said keeper seat.

6. The structure according to claim 5, and wherein said body is further provided with an auxiliary bore at right angles to and opening at an inner end in to a median portion of said first-named bore, and a spring-loaded ball detent adjustable in said auxiliary bore and spring-biased into engagement with a surface portion of said shank.

7. The structure defined in claim 5, and wherein the lower median portion of said body is provided with a recess, the latter opening through said bottom and also said inwardly facing surface and communicating with said notch, said detent comprising a screw-threaded headed fastener screwed into a threaded hole provided therefor in said shank and the headed end being accessible by way of said recess and selectively alignable with said notch.

8. The structure according to claim 5, and wherein the upper left and right corner portions of the outwardly facing part of said body have clearance notches for the bill portion of said hook, said notches communicating with the cooperating upper end portions of said grooves to facilitate storing of the hook in either of said grooves.

References Cited by the Examiner
UNITED STATES PATENTS

| | | | |
|---|---|---|---|
| Re. 16,927 | 4/1928 | Rosencrans | 280—179 |
| 2,166,989 | 7/1939 | Gleason | 248—361 |
| 2,532,743 | 12/1950 | Storch | 248—361 |
| 2,856,865 | 10/1958 | Reynolds et al. | 105—369 |
| 3,082,990 | 3/1963 | Nelson | 248—308 |

CLAUDE A. LE ROY, *Primary Examiner.*

FRANK L. ABBOTT, *Examiner.*